UNITED STATES PATENT OFFICE 2,562,830

DERIVATIVES OF 3:5-DIOXO-PYRAZOLIDINE AND PROCESS FOR THEIR MANUFACTURE

Hans Stenzl, Basel, Switzerland, assignor to J. R. Geigy A. G., Basel, Switzerland, a Swiss company No Drawing. Application March 16, 1949, Serial No. 81,836. In Switzerland March 22, 1948

17 Claims. (Cl. 260—310)

The present invention is concerned with processes for the manufacture of new derivatives of 3:5-dioxo-pyrazolidine, corresponding to the general formula

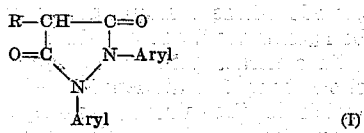

or to its tautomeric forms, as well as of their salts with inorganic and organic bases. In this formula and in those given later on: R means a hydrocarbon radical containing from 2-10 carbon atoms linked to the pyrazolidine nucleus by a non-quaternary carbon atom, particularly a saturated or unsaturated aliphatic radical, a cycloaliphatic radical, or a phenyl substituted aliphatic radical whose phenyl nucleus may further be substituted by halogen, a lower alkyl or alkoxy radical containing 1-3 carbon atoms, and Aryl means a phenyl radical unsubstituted or substituted by halogen, a lower alkyl or alkoxy radical containing 1-3 carbon atoms.

In the above definition of R a non-quaternary carbon atom means a carbon atom which is connected with at least one hydrogen atom. Thus a —CH$_2$— group each free valency thereof being connected to a carbon atom contains a secondary carbon atom, whereas the —CH— group, each free valency thereof being connected to a carbon atom contains a tertiary carbon atom.

The 3:5-dioxo-pyrazolidines of the invention can be made by allowing a reactive derivative of a monosubstituted malonic acid having the formula

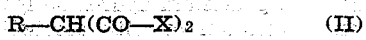

R—CH(CO—X)$_2$    (II)

wherein X is a radical which can split off from the acid derivative such as, e. g., halogen (acid halide), an alkoxy group (acid ester) or the like, to react with a 1:2-diaryl hydrazine of the formula Aryl—NH—NH—Aryl    (III).

The reaction is suitably carried out in the presence of a condensing agent or an acid-binding medium, as described below.

A preferred method of manufacture consists in heating a dialkyl ester, above all the diethyl ester, of a monosubstituted malonic acid, with a diaryl hydrazine in the presence of a metal alcoholate, e. g., sodium ethylate or potassium tert. butylate. This brings about ring-closure with the splitting off of two molecules of the alcohol, which it is convenient to distill off, at temperatures between 100 and 200° C.

As condensing agents there come into consideration such compounds as are suitable for the replacement of a movable hydrogen atom by a metal atom, such as alkali metals and active alkali compounds. As further examples may be mentioned metallic potassium, sodium methyl, sodium amide and phenyl lithium.

A number of other ways of carrying out the same process will now be described. These modifications consist in using other reactive derivatives instead of a di-ester of malonic acid of Formula II, such as, for example, a dihalide, an ester chloride, an ester amide and so on.

Condensation of a diarylhydrazine of Formula III with a malonic acid halide of Formula II, e. g., the dichloride, takes place in a solvent which is indifferent to the acid halide, such as ether or benzene. In order to repress as far as possible the rearrangement of the diarylhydrazine by the hydrogen halide produced, it is advisable to carry out the condensation in the presence of an acid-binding agent, preferably a tertiary organic base such as pyridine or dimethylaniline. In this case the reaction takes place even at low temperatures which may suitably be in the neighbourhood of 0° C.

It is particularly easy to carry out the condensation in steps if unsymmetrical reactive derivatives of malonic acid (Formula II) are used. For example, the esterchloride

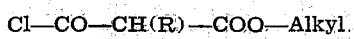

Cl—CO—CH(R)—COO—Alkyl.

can be treated with a diaryl hydrazine III to give firstly the acyl derivative IV, by allowing the components to react in the ratio of their molecular weights in ether or benzene in the presence of pyridine. Ring closure may then be brought about by heating with sodium ethylate:

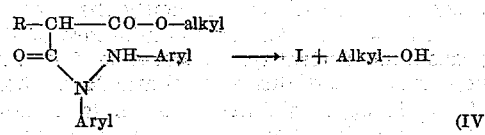

Instead of a diarylhydrazine of Formula III an N-acyl derivative of the same, e. g., N-acetyl-hydrazobenzene, can also be reacted with the reactive derivative of a malonic acid of Formula II, especially with a dialkyl ester. On heating with the condensing agents named, the acyl radical is split off, the ring closing to give the pyrazolidine derivative of Formula I.

Another process for the production of the pyrazolidine derivative of Formula I can in some cases be of advantage, since it proceeds not from derivatives of substituted malonic acid (IX) but directly from those of malonic acid itself, for example, from diethyl malonate. This method consists in introducing the radical R into the 4-position of a 1:2-diaryl-3:5-dioxo-pyrazolidine of Formula V

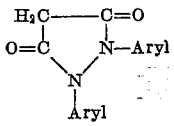
(V)

This can be done by reacting the pyrazolidine derivative V or a salt thereof, preferably in the presence of an acid-binding agent with a compound of the formula R—X, where X can mean Cl, Br, I, $SO_4R$ or $SO_3Aryl$.

The temperature necessary for the reaction depends on the reactivity of the compound R—X; it is well known, for example, that iodine compounds react more easily than bromine compounds. The setting in of the reaction as well as its course can be easily followed by the formation of X ions. Generally speaking, temperatures between 0° C. and 100° C. are suitable.

The group R can also be introduced by hydrogenating the diketopyrazolidine V in the presence of a carbonyl compound of the formula R'=O, where R' stands for a divalent hydrocarbon radical containing 2-10 carbon atoms, whose linkage valencies are attached to the same carbon atom, particularly a saturated or an unsaturated aliphatic radical, a cycloaliphatic radical, or a phenyl substituted aliphatic radical. Because of its simplicity and the good yield this process is of special interest technically.

A variation of this method consists in hydrogenating the condensation product VI derived from the dioxo-pyrazolidine V and the carbonyl compound R'=O.

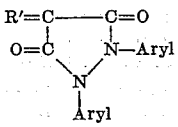
(VI)

In both cases hydrogenation is preferably carried out with hydrogen in the presence of a catalyst, such as finely divided nickel, platinum or palladium. Other reducing procedures, such as the use of sodium amalgam and water offer no advantages over this method.

However, it must be noted in connection with this process that when the radical R' contains an aliphatic double bond it is difficult to avoid hydrogenating it and the yield in such circumstances is usually unsatisfactory. On the other hand the corresponding saturated derivative can be easily prepared. Consequently the process is primarily suitable for the manufacture of those pyrazolidine derivatives of Formula I in which the radical R contains no aliphatic double bonds.

The dioxopyrazolidines of Formula V can be prepared by the methods known per se for the manufacture of 1:2-diphenyl-3:5-dioxo-pyrazolidine; the most suitable is the condensation of malonic ester with the corresponding diarylhydrazine of Formula III in the presence of a metal alcoholate, e. g., sodium ethylate.

The substituted pyrazolidine derivatives of Formula VI are derived from the unsubstituted parent compounds V by methods known per se (Bl. Chem. Soc. Japan, 1931, 6, 1-9, 1932, 7, 45-50).

The 1:2-diaryl-3:5-dioxo-pyrazolidines of Formula I preparable according to the present invention are intended for use as therapeutics with an analgesic and antipyretic action.

Although most diaryl-dioxo-pyrazolidines of Formula I have a noticeable analgesic and/or antipyretic effect, the extent of this action varies within the group of compounds named. In order to make the description more complete it may therefore be added that the compounds with the best antipyretic and analgesic effect include 1:2 - diphenyl - 3:5-dioxo-4-alkyl-pyrazolidines, whose alkyl radical contains from 3 to 5 carbon atoms, particularly 4-n-butyl-, 4-n-propyl- and 4-isopropyl-1:2-diphenyl-3:5-dioxo-pyrazolidine. The 4-benzyl derivative also has a very good analgesic action, while antipyretic activity is especially well developed in the case of the 4-cyclohexyl derivative. Compounds with substituents in the phenyl radicals approximate the corresponding parent compounds in activity, without surpassing them. For this reason the more readily available 1:2 diphenyl derivatives are generally to be preferred to those with substituted phenyl radicals. Here too, those compounds whose 4-alkyl radical contains 3-5 carbon atoms are the most valuable.

In contrast with the foregoing my researches show that 1:2-diphenyl-3:5-dioxo-pyrazolidine, which is the already known compound most nearly comparable to the pyrazolidines of Formula I, possesses practically no analgesic or antipyretic activity.

The dioxo-pyrazolidine derivatives prepared according to the invention can also form salts with basic compounds. Alkali-metal salts are readily soluble in water, while the solubility of the alkaline earth metal salts is less and decreases with increasing atomic weight of the metal. The heavy metal salts are only slightly soluble in water, but salts with organic bases possess a high degree of solubility.

This property of salt-formation represents a great advantage of the compounds described as compared with other analgesic and antipyretic substances, particularly since the solutions of these salts are only weakly alkaline and are suitable for purposes of injection. For this purpose those salts with the less toxic cations should be used such as the sodium or magnesium salts or those of ethylenediamine triethanolamine or trimethylamine.

To prepare the soluble salts, the free pyrazolidine of Formula I is treated with an equimolecular quantity of a base containing the desired cation, e. g., with aqueous caustic soda, ethylenediamine, potassium hydroxide lye or sodium carbonate solution or with alcoholic caustic soda. It is best to employ stirring or shaking during the reaction. If an aqueous lye is used, then an excess of the pyrazolidine may be present, which, after the solution is neutral to phenolphthalein, can be removed by filtration.

The salt can be obtained in solid form when desired either by evaporation of the filtered solution or by adding a solvent in which the salt is insoluble, for example, by the addition of ether to an alcoholic solution of the sodium salt.

However, it is also possible to obtain the corresponding salt directly when using alkaline condensing agents, such as, for example, sodium ethylate.

The alkali salts are mostly in the form of colourless powders, usually of considerable stability in the air, which are readily soluble in water and alcohol. Their solutions do not turn phenolphthalein red.

The difficultly soluble salts can be also prepared by double decomposition of an alkali or ammonium salt of a pyrazolidine of Formula I with a soluble alkaline earth or heavy metal salt, e. g., calcium chloride or silver nitrate. When working with a sufficiently concentrated solution the salts are obtained directly as precipitates. Alternatively they can be isolated by suitably concentrating or cooling the solution.

In the following examples a few methods of carrying out the manufacture as well as some of the compounds obtained are described in more detail. Parts are by weight. The relationship of parts by weight to parts by volume is that of kilograms to litres. Temperatures are in degrees centigrade.

EXAMPLE 1

7.6 parts of sodium are dissolved in 190 parts by volume of absolute alcohol; 65 parts of diethyl-n-butyl malonate and 55 parts of hydrazobenzene are added. The alcohol is slowly distilled off and the reaction mixture heated for 12 hours at a bath temperature of 150°, and finally in vacuo, until no more alcohol comes off.

The product is dissolved in water, clarified with a little animal charcoal and 15% hydrochloric acid is slowly added until an acid reaction to Congo red paper is produced. 1:2-diphenyl-3:5-dioxo-4-n-butyl-pyrazolidine separates as an oil, which rapidly becomes crystalline. It crystallises from alcohol as colourless needles with a melting point of 105°.

EXAMPLE 2

The same compound, 1:2-diphenyl-3:5-dioxo-4-n-butyl-pyrazolidine is obtained if the hydrazobenzene in Example 1 is replaced by 68 parts of N-acetyl-hydrazobenzene the method being otherwise the same. In this modification the coloured by-products formed are somewhat less than by the method of Example 1. The yield is good in this case too.

EXAMPLE 3

19 parts of n-butyl-malonyl-dichloride (B. P. 85° at 14 mm. pressure) are added dropwise to a mixture of 50 parts absolute pyridine and 200 parts by volume of absolute ether at about 0°. Next, 18 parts of hydrazobenzene, dissolved in 100 parts by volume of ether are added and the mixture stirred for two hours at room temperature. The solution is then shaken with 2 N hydrochloric acid to remove the pyridine, followed by 2 N sodium carbonate solution. The latter, which contains the sodium salt of 1:2-diphenyl-3:5-dioxo-4-n-butyl-pyrazolidine in solution is acidified with 10% hydrochloric acid, whereupon the free pyrazolidine derivative separates out.

EXAMPLE 4

1:2-diphenyl-3:5-dioxo-pyrazolidine (Ber. d. deutschen Chem. Ges., 1940, 73, 822) is heated for 5 hours on the boiling water-bath with five times its weight of cyclohexanone. The excess of cyclohexanone is then distilled off in vacuo and the residue recrystallised from alcohol. The 1:2-diphenyl-3:5-dioxo-4-cyclohexylidene-pyrazolidine so obtained consists of yellow needles melting at 173°. If it is treated with hydrogen (at about 30 atmospheres pressure) in the presence of Raney nickel at 100°, then 1:2-diphenyl-3:5-dioxo-4-cyclohexyl-pyrazolidine is formed. The latter compound is difficultly soluble in alcohol and has a melting point of 177°.

If 1:2-diphenyl-3:5-dioxo-4-benzylidene-pyrazolidine is hydrogenated in a similar manner (Bl. Chem. Soc. Japan, 1931, 6, 8), then 1:2-diphenyl-3:5-dioxo-4-benzyl-pyrazolidine with a melting point of 136–138° is formed.

In the same way 1:2-diphenyl-3:5-dioxo-4-(γ-phenyl-propyl)-pyrazolidine may be prepared from 1:2-diphenyl-3:5-dioxo-4-cinnamylidene-pyrazolidine (loc. cit.), 1:2-diphenyl-3:5-dioxo-4-(α-phenylethyl)-pyrazolidine from 1:2-diphenyl-3:5-dioxo-4-(α-phenylethylidene)-pyrazolidine (Bl. Chem. Soc. Japan, 1931, 6, 9), 1:2-diphenyl-3:5-dioxo-4-(p-methyl-benzyl)-pyrazolidine from 1:2-diphenyl-3:5-dioxo-4-(p-methyl-benzal)-pyrazolidine (Bl. Chem. Soc. Japan 1932, 7, 45 et seq.), 1:2-diphenyl-4-(p-methoxy-benzyl)-3:5-dioxo-pyrazolidine from 1:2-diphenyl-4-(p-methoxy-bezal)-3:5-dioxo-pyrazolidine (loc. cit.), 1:2-diphenyl-4-piperonyl-3:5-dioxo-pyrazolidine from 1:2-diphenyl-3:5-dioxo-4-piperonylidene-pyrazolidine (loc. cit.) and 1:2-diphenyl-3:5-dioxo-4-n-propyl-pyrazolidine (m. pt. 108–109°) from 1:2-diphenyl-3:5-dioxo-4-propylidene-pyrazolidine (loc. cit.).

EXAMPLE 5

1:2-diphenyl-3:5-dioxo-pyrazolidine is heated to boiling for 10 minutes with double its weight of cyclopentanone. On diluting the solution with alcohol and cooling yellow crystals of 1:2-diphenyl-3:5-dioxo-4-cyclopentylidene-pyrazolidine (m. pt. 153°) crystallise out. When the latter compound is hydrogenated in alcoholic solution at 50° in the presence of Raney nickel and at atmospheric pressure, 1:2-diphenyl-3:5-dioxo-4-cyclopentyl-pyrazolidine, melting at 172°, is produced. It dissolves gradually on shaking with 2 N caustic soda lye with the formation of the sodium salt. It is soluble only with difficulty in alcohol.

EXAMPLE 6

A solution of 160 parts of 1:2-diphenyl-3:5-dioxo-pyrazolidine and 120 parts of benzaldehyde in 500 parts by volume of alcohol is heated to 100° under 20 atmospheres of hydrogen in the presence of Raney nickel, until the hydrogen is taken up only slowly and the solution becomes colourless. 1:2-diphenyl-3:5-dioxo-4-benzyl-pyrazolidine crystallises from the hot, filtered solution.

EXAMPLE 7

1:2-diphenyl-3:5-dioxo-pyrazolidine dissolved in 10 times the amount of acetone is hydrogenated at 100° under 20 atmospheres' pressure of hydrogen in the presence of Raney nickel. On evaporating down the filtered acetone solution, 1:2-diphenyl-3:5-dioxo-4-isopropyl-pyrazolidine crystallises out in good yield. It melts at 143°.

EXAMPLE 8

25 parts of 1:2-diphenyl-3:5-dioxo-pyrazolidine are dissolved in 100 parts of 2 N caustic soda lye. 14 parts of 1-bromo-butane are slowly dropped in, while stirring, and the mixture warmed to 70°. Undissolved oily fractions are removed by shaking with ether and the aqueous solution is then acidified with 10% hydrochloric acid. A precipitate of 1:2-diphenyl-3:5-dioxo-4-butyl-pyrazolidine is obtained, melting at 105°.

Similarly, 1:2-diphenyl-3:5-dioxo-4-(p-chlorobenzyl)-pyrazolidine is obtained from 25 parts of 1:2-diphenyl-3:5-dioxopyrazolidine dissolved in 100 parts by volume of 2 N caustic soda lye by reacting with 16 parts of 4-chlorobenzyl chloride.

EXAMPLE 9

To a sodium ethylate solution prepared from 23 parts of sodium and 500 parts by volume of absolute alcohol is added, while stirring, an equimolecular amount (308 parts) of 1:2-diphenyl-3:5-dioxo-4-n-butyl-pyrazolidine. The solution thus obtained, after filtration, if necessary, is evaporated to dryness in vacuo. The residue is triturated with absolute ether and filtered under suction. The sodium salt of 1:2-diphenyl-3:5-dioxo-4-n-butyl-pyrazolidine is left as a colourless powder which is readily soluble in water. The aqueous solution reacts weakly alkaline but is not, however, alkaline to phenolphthalein.

The sodium salts of other 4-substituted 1:2-diphenyl-3:5-dioxo-pyrazolidines may be prepared similarly.

EXAMPLE 10

30 parts of diethylamine are poured over 10 parts of 1:2-diphenyl-3:5-dioxo-4-n-butyl-pyrazolidine. The latter dissolves and, on rubbing, the salt separates out in crystalline form. The diethylamine salt of 1:2-diphenyl-3:5-dioxo-4-n-butyl-pyrazolidine thus obtained loses part of the base when exposed to the atmosphere.

*Alternative method.*—10 parts of 1:2-diphenyl-3:5-dioxo-4-n-butyl-pyrazolidine are dissolved in 50 parts of hot absolute alcohol and about 40 parts of diethylamine are then added. The diethylamine salt of 1:2-diphenyl-3:5-dioxo-4-n-butyl-pyrazolidine is precipitated out by adding absolute ether, filtered off under suction and washed with ethereal diethylamine solution.

The methods described in the above examples can be applied, as will be clear to those skilled in the art, for the production of other 4-substituted 1:2-diphenyl-3:5-dioxo-pyrazolidines. For example, in addition to those given above, the following compounds may be prepared:

*General formula*

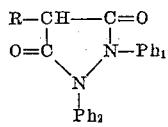

| Ph₁ | Ph₂ | R | Melting Point |
|---|---|---|---|
| | | | *Degrees* |
| C₆H₅ | C₆H₅ | CH₃ | 114–116 |
| Do | do | C₂H₅ | 108 |
| Do | do | CH₂—CH=CH₂ | 135 |
| Do | do | iso-C₄H₉ | 127–128 |
| Do | do | CH₂—CH=CH—CH₃ | 128 |
| Do | do | n—C₅H₁₁ | 104–105 |
| Do | do | iso—C₅H₁₁ | 137 |
| Do | do | CH(CH₃)—CH₂—CH(CH₃)₂ | 107–108 |
| Do | do | CH₂—⟨C₆H₃⟩—OCH₃, OCH₃ | 133 |
| Do | do | CH₃—CH—CH₂—CH₃ | 116 |
| Do | do | n—C₇H₁₅ | 95 |
| C₆H₄—CH₃(p) | C₆H₄—CH₃(p) | iso—C₃H₇ | 167 |
| Do | do | n—C₄H₉ | 133 |
| C₆H₄—Cl(p) | C₆H₅ | n—C₄H₉ | 132 |
| Do | C₆H₄—Cl(p) | n—C₄H₉ | 132 |
| C₆H₄—OCH₃(p) | C₆H₄—OCH₃(p) | n—C₄H₉ | 198 |
| C₆H₄—OC₂H₅(p) | C₆H₅ | n—C₄H₉ | 81.5 |

What I claim is:

1. A process which comprises condensing diethyl malonate with 1:2-di-phenyl-hydrazine in the presence of an alkali metal alcoholate and treating the isolated 1:2-di-phenyl-3:5-dioxo-pyrazolidine in the presence of a hydrogenation catalyst with hydrogen and with a carbonyl compound of the formula $$R=O$$

wherein R represents a divalent hydrocarbon radical containing 2–10 carbon atoms and whose linkage valencies are attached to the same carbon atom, separating the hydrogenation catalyst, and isolating the final product by crystallisation.

2. A member selected from the group consisting of compounds of the formula

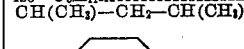

wherein R represents a hydrocarbon radical containing 2–10 carbon atoms and linked to the pyrazolidine nucleus by a non-quaternary carbon atom and Aryl represents a phenyl radical substituted by a member selected from the group consisting of H, chlorine, a lower alkyl and a lower alkoxy group, and salts thereof with bases.

3. A member selected from the group consisting of compounds of the formula wherein R represents an alkyl radical containing from 3–5 carbon atoms and Aryl represents a phenyl radical and salts thereof with bases.

4. A member selected from the group consisting of 1:2-diphenyl-4-propyl-3:5-dioxo-pyrazolidine and salts thereof with bases.

5. A member selected from the group consisting of 1:2-di-phenyl-4-iso-propyl-3:5-dioxo-pyrazolidine and salts thereof with bases.

6. A member selected from the group consisting of 1:2-di-phenyl-4-butyl-3:5-dioxo-pyrazolidine and salts thereof with bases.

7. A member selected from the group consisting of 1:2-di-phenyl-4-n-butyl-3:5-dioxo-pyrazolidine and salts thereof with bases.

8. A member selected from the group consisting of compounds of the formula

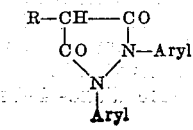

wherein R represents a phenyl substituted aliphatic radical containing not more than 10 carbon atoms and Aryl represents a phenyl radical and salts thereof with bases.

9. A member selected from the group consisting of 1:2-di-phenyl-4-benzyl-3:5-dioxo-pyrazolidine and salts thereof with bases.

10. A member selected from the group consisting of compounds of the formula

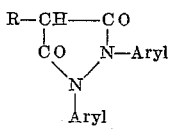

wherein R represents a cycloalkyl radical containing from 5-6 carbon atoms and Aryl represents a phenyl radical and salts thereof with bases.

11. A member selected from the group consisting of 1:2-di-phenyl-4-cyclohexyl-3:5 - dioxo-pyrazolidine and salts thereof with bases.

12. An antipyretic and analgesic for injection purposes comprising an aqueous solution of a salt of a compound of the formula

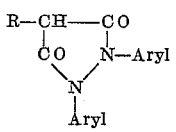

wherein R represents a hydrocarbon radical containing 2-10 carbon atoms and linked to the pyrazolidine nucleus by a non-quaternary carbon atom and Aryl represents a phenyl radical substituted by a member selected from the group consisting of H, chlorine, a lower alkyl and a lower alkoxy group.

13. An antipyretic and analgesic for injection purposes comprising an aqueous solution of a salt of a compound of the formula

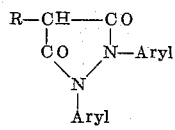

wherein R represents an alkyl radical containing from 3-5 carbon atoms and Aryl represents a phenyl radical.

14. An antipyretic and analgesic for injection purposes comprising an aqueous solution of an alkali salt of the 1:2-di-phenyl-4-propyl-3:5-dioxo-pyrazolidine.

15. An antipyretic and analgesic for injection purposes comprising an aqueous solution of an alkali salt of the 1:2-di-phenyl-4-iso-propyl-3:5-dioxo-pyrazolidine.

16. An antipyretic and analgesic for injection purposes comprising an aqueous solution of an alkali salt of the 1:2-di-phenyl-4-butyl-3:5-dioxo-pyrazolidine.

17. An antipyretic and analgesic for injection purposes comprising an aqueous solution of an alkali salt of the 1:2-di-phenyl-4-n-butyl-3:5-dioxo-pyrazolidine.

HANS STENZL.

REFERENCES CITED

The following references are of record in the file of this patent:

Ruhkopf: Ber. Deut. Chem. Ges., vol. 73-B, pp. 820–822 (1940).

Chem. Abstracts, vol. 41, pp. 3095ᵍ (1947), citing Active Journal Chem. Soc. Japan, vol. 62 (1941), pp. 1022–1027.